United States Patent
Pauley, Jr. et al.

(10) Patent No.: US 11,106,834 B2
(45) Date of Patent: *Aug. 31, 2021

(54) DIGITAL DISAPPEARING INK

(75) Inventors: Wayne A Pauley, Jr., Hudson, NH (US); Stephen J Todd, Shrewsbury, MA (US); Michel F Fisher, Natick, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/536,637

(22) Filed: Jun. 28, 2012

(65) Prior Publication Data

US 2020/0380176 A1 Dec. 3, 2020

Related U.S. Application Data

(63) Continuation-in-part of application No. 13/247,423, filed on Sep. 28, 2011.

(51) Int. Cl.
*G06F 21/88* (2013.01)
*G06F 21/55* (2013.01)

(52) U.S. Cl.
CPC ............ *G06F 21/88* (2013.01); *G06F 21/55* (2013.01)

(58) Field of Classification Search
CPC ...................................................... H04L 63/20
USPC ............................................................. 726/22
See application file for complete search history.

(56) References Cited

U.S. PATENT DOCUMENTS

| | | | |
|---|---|---|---|
| 8,321,909 B2* | 11/2012 | Fot et al. | 726/1 |
| 2001/0010044 A1* | 7/2001 | Aieta | G06Q 50/188 705/50 |
| 2003/0187976 A1* | 10/2003 | Decime | H04L 29/06 709/224 |
| 2004/0006706 A1* | 1/2004 | Erlingsson | G06F 21/51 726/30 |
| 2005/0257250 A1* | 11/2005 | Mitchell | G06F 21/6245 726/3 |
| 2011/0247080 A1* | 10/2011 | Claussen | G06F 21/6218 726/28 |
| 2012/0030187 A1* | 2/2012 | Marano | G06F 21/6218 707/709 |
| 2012/0227082 A1* | 9/2012 | Fot et al. | 726/1 |

* cited by examiner

*Primary Examiner* — Kambiz Zand
*Assistant Examiner* — Aubrey H Wyszynski
(74) *Attorney, Agent, or Firm* — Krishnendu Gupta; Anne-Marie Dinius

(57) ABSTRACT

Example embodiments of the present invention relate to a method, an apparatus and a computer-program product for implementing digital disappearing ink. An example method includes receiving portions of a data stream transmitted from a source and analyzing the portions of the data stream. Based on the analysis, the method includes performing an action with respect to an object tag according to the analysis.

20 Claims, 5 Drawing Sheets

DIGITAL DISAPPEARING INK

CROSS REFERENCE TO RELATED APPLICATIONS

This Application is a Continuation-in-Part of U.S. patent application Ser. No. 13/247,423 entitled "METHOD AND APPARATUS FOR FRIENDLY MAN-IN-THE-MIDDLE DATA STREAM INSPECTION" filed on Sep. 28, 2011, the contents and teachings of which are incorporated herein by reference in their entirety.

This Application is related to U.S. patent application Ser. No. 13/247,549 entitled "METHOD AND APPARATUS FOR PRIVACY-RESPECTING NOTIFICATION OF SECURITY THREATS-" and Ser. No. 13/247,623 entitled "METHOD AND APPARATUS FOR ENCRYPTION WITH VIEWER IDENTITY AND CONTENT ADDRESS-BASED IDENTITY PROTECTION", filed on Sep. 28, 2011; Ser. No. 13/340,104 entitled "TIME-BASED ANALYSIS OF DATA STREAMS" and Ser. No. 13/340,007 entitled "DATA TRACKING FOR PROVENANCE AND CHAIN OF CUSTODY GENERATION", filed on Dec. 29, 2011; Ser. No. 13/436,702 entitled "METHOD AND APPARATUS FOR COOKIE ANONYMIZATION AND REJECTION" filed on Mar. 30, 2012; and Ser. No. 13/536,337 entitled "METHOD AND APPARATUS FOR MAN-IN-THE-MIDDLE AGENT-ASSISTED CLIENT FILTERING" Ser. No. 13/536,504 entitled "METHOD AND APPARATUS FOR CONTENT, ENDPOINT, AND PROTOCOL MAN-IN-THE-MIDDLE USER INTERFACE", filed on even date herewith, the teachings of which are hereby incorporated by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data privacy.

BACKGROUND

Privacy is the claim of individuals, groups or institutions to determine for themselves when, how, and to what extent information about them is communicated to others. Private information is frequently made public or semi-public via emails, blogs and postings to social networking services, such as Facebook, Twitter, LinkedIn and FourSquare, often without foresight as to the consequences of such a divulgence. It has been reported that information publicly posted to social networking services has been used in firing individuals from their employment and has been used by criminals to find targets for burglaries.

Additionally, intentionally divulged information that is intended to be maintained as private is routinely sold to advertisers and information brokers. Moreover, with the proliferation of app usage in mobile devices, additional information is available on the "information market," including users' location, age, gender, income, ethnicity, sexual orientation and political views. As recently reported by the Wall Street Journal, of 101 popular smartphone apps, 56 transmitted the device ID without the user's consent, 47 sent location information, and 5 sent age, gender and other personally identifiable information is outsiders.

SUMMARY

Example embodiments of the present invention relate to a method, an apparatus and a computer-program product for implementing digital disappearing ink. An example method includes receiving portions of a data stream transmitted from a source and analyzing the portions of the data stream. Based on the analysis, the method includes performing an action with respect to an object tag according to the analysis.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
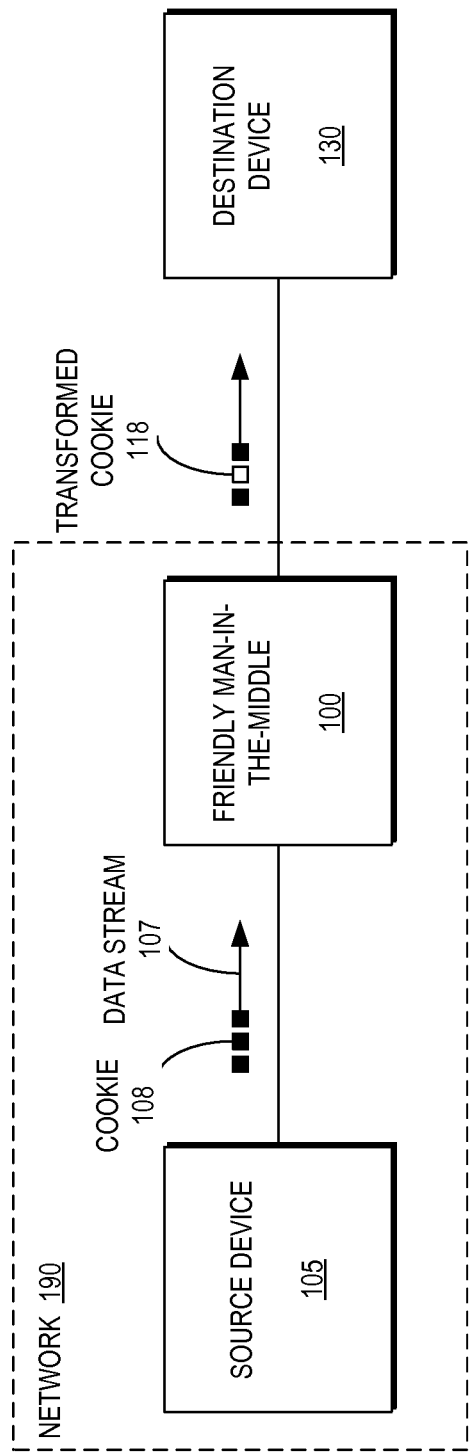
FIGS. 1 and 2 are block diagrams illustrating an example embodiment of the present invention deployed in a network environment.

As the number of Internet-connected devices in the home and the enterprise continues to rise, the concept of privacy is increasingly caught in the midst of two divergent forces: that individual, group or institution's likely desire to maintain information as private, and the increasing vulnerability of such information to a privacy breach or unintended disclosure. Internet-connected devices in the household/enterprise may include personal computers, laptop computer, televisions, audiovisual receiver, music players, radio, appliances and gaming systems. While many of these devices have a method to block Internet access wholesale, they lack finer-grain controls for limiting Internet access.

For example, current methods for controlling the disclosure of private information include centralized devices that block wholesale access to a particular resource by using source/destination routing filters, regardless of content that is being sent to or received from that resource. Further, while there are some endpoint-based protections that examine content, they are one-off per client, require an administrator to set up and manage each device manually, and do not protect all device types (i.e., are only available on certain platforms). Moreover, while many of these devices provide logging capabilities, the rapidly increasing number of such devices and the amount of information they log removes from the realm of possibility an administrator's ability to police those logs to determine, albeit after the fact, private information that was disclosed.

Part of the content flowing over the network is cookies/beacons. Cookies provide an unknown leakage of private information from internal systems to external networks. One example of a cookie is a key-click cookie, which enables marketing for every click that a user is making and is often associated with free applications. That cookie may contain sensitive information like name, age, sex, location, account numbers, etc. Malware can hijack cookies and accelerate the leakage of information by continually uploading sensitive information at a very high rate. Web beacons leak user activity between websites out to external sources.

As understood in the art, these objects are buffers that may be filtered and examined. However, traditional packet inspectors typically only look at fingerprint, source, and destination information, but do not inspect at the content level. Therefore, content-aware drill-down analysis of cookies/beacons may enable an administrator to decipher cookie content and establish one or more policies to either block or anonymize cookies/beacons. Further, the pace and frequency of cookies can also be viewed.

Therefore, a centralized point of control is desirable that performs a lexical analysis of cookies/beacons in a data stream. Within the household, for example, a broadband router is generally a common access point for most home-based Internet-connected devices. In other words, example embodiments of the present invention provide an intelligent layer implemented, for example, in the router (or as a standalone device) that can inspect the payload of a cookie/beacon in a data stream for keywords and employ a blocking or masking mechanism to protect unauthorized or potentially harmful data from escaping the household (i.e., intentional or accidental), irrespective of source-type (i.e., agentless) and in a manner transparent to the destination.

Example embodiments of the present invention specifically targets cookies and beacons that flow through a system, and historically track cookie and beacon traffic in order to perform drill-down inspection on the contents. This inspection allows for detection of sensitive information such as credit cards, location, and any other personal info, as well as the potential presence of malware which is performing unusual behavior within the private system.

FIG. 1 is a block diagram illustrating an example embodiment of the present invention 100 in a network environment 190. As illustrated in FIG. 1, the network 190 includes a source device 105 that may transmit a data stream 107, including a cookie 108, intended for a destination (e.g., destination device 130). However, a friendly (i.e., blessed) man-in-the-middle (FMITM) 100 receives (i.e., intercepts) the data stream 107 before the data stream escapes the network 190 toward the destination device 130. As will be discussed in greater detail below, the FMITM 100 performs a lexical analysis of content (i.e., payload) of cookies 108 included in the data stream 107. The FMITM 100 then forwards the cookie 108 out of the network 190 to the intended destination device 130 as a transformed data stream 118 according to the lexical analysis. It should be noted that, in certain embodiments, the transformed data stream 118 may be a blocking of the cookie 108 or an anonymization of the cookie 108.

Figure 2:
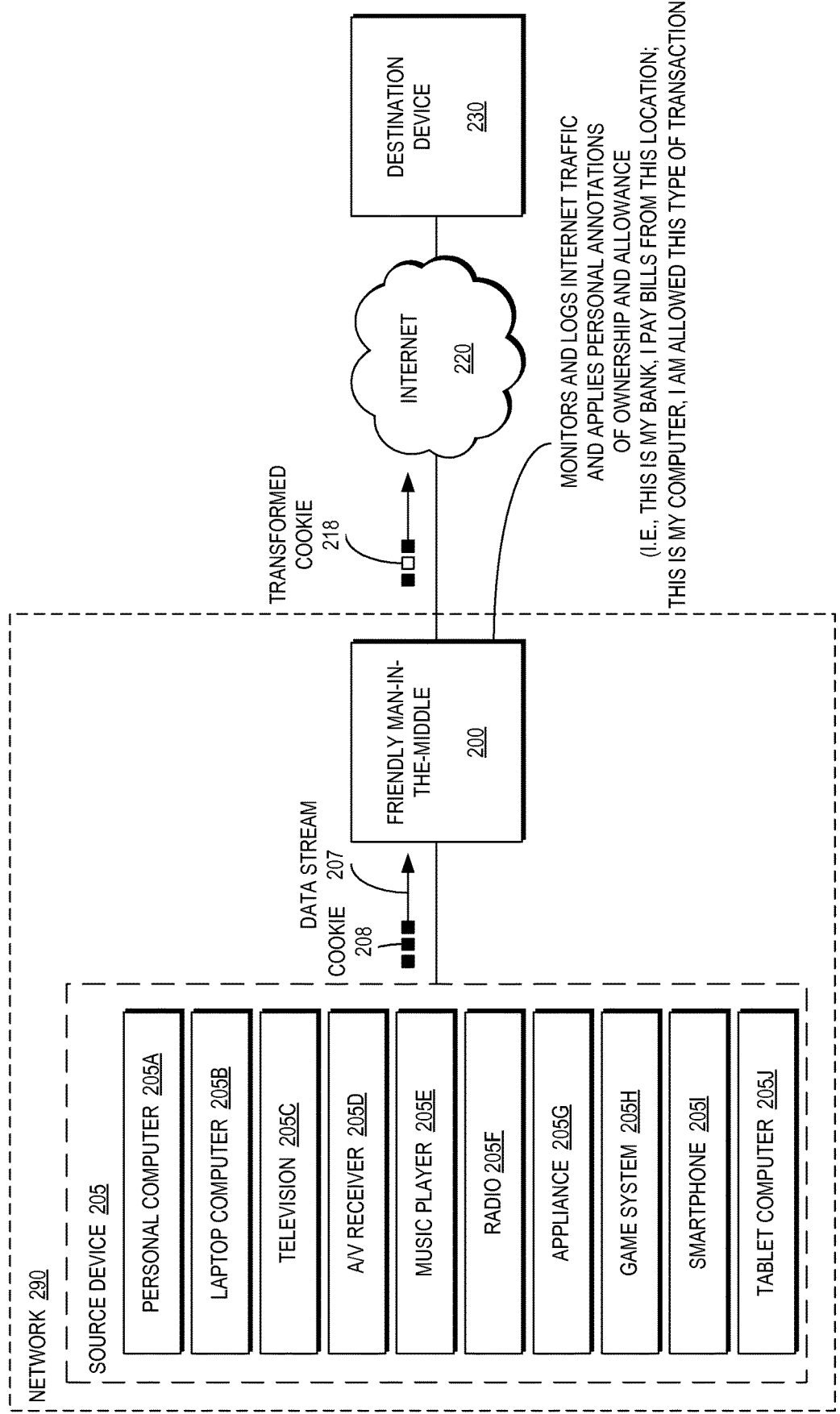

FIG. 2 is a block diagram illustrating an example embodiment of the present invention 200 in a network environment 290. As illustrated in FIG. 2, the network 290 includes a source device 205 (e.g., personal computer 205A, laptop computer 205B, television 205C, A/V receiver 205D, music player 205E, radio 205F, appliance 205G, game system 205H, smartphone 205I, and table computer 205J) that may transmit a data stream 207, including a cookie 208, intended for a destination (e.g., destination device 230). However, a FMITM 200 receives (i.e., intercepts) the data stream 207 before the data stream escapes the network 290 toward the destination device 230 over the Internet 220. It should be understood that the FMITM 200 may intercept both wired (e.g., over Ethernet) and wireless (e.g., over WiFi) data streams 207 in the network 290.

Likewise, the FMITM 200 may include additional hardware, such as a picocell, from a cellular telephony carrier to permit the FMITM 200 to intercept wireless communications (i.e., voice and data) from cellular telephones, tablet computers and the like connected to the cellular telephony carrier (e.g., over 3G or 4G connections). The FMITM 200 then forwards the cookie 208 out of the network 290 to the intended destination device 230 as a transformed data stream 218 according to the lexical analysis. In other embodiments, the FMITM 200 may include hardware to act as a repeater for the cellular telephony carrier so that it may intercept wireless communications and forward them back to the cellular telephony carrier's network (e.g., 3G or 4G network).

Digital Disappearing Ink

In certain scenarios, the context of an object may change over time. Similarly, information (i.e., object) that is kept past its useful lifetime may become a liability. Further information (i.e., object) may have restrictive policies on it at a first time, but may not need those same restrictions at a second time.

For example, a marketing organization may want to send out messages with a special offer that is valid for one week. However, once that week ends, the recipient has to delete the message (i.e., object) manually. Otherwise, the object wastes storage space and backup resources. Further, an object, such as a baby picture, may be set with strict policy on who can see the picture, on what device, and in what location. It should be understood that the picture may need strong protections to protect the privacy and safety of the child. However, the necessity of these protections may fade over time based on future events which change the context of the need for the original protections (e.g., the child becomes an adult). Moreover, a legal document may be regulated, requiring the document be kept for a period of time (e.g., ten years). Traditionally, the document may be stored on specialized storage or in a specialized database that has policies to manage the object and later auto delete the object when the time period expires. However, if a copy of the document is stored elsewhere (i.e., not on the specialized storage or not in the specialized database), that copy is not managed.

Example embodiments of the present invention may overcome these and other obstacles by extending the content, protocol, and endpoint capabilities of the FMITM with a lease (e.g., absolute or delta), a lease lifetime, and an action flag triggered by lease event on the meta-tags associated with the FMITM. By embedding a lease flag and lease event on the tags it becomes possible to make objects change their protections based on lease expiration. For example, at lease expiration, the tag and the policy may cause the object to be deleted (i.e., disappear).

Example embodiments of the present invention may add a lease tag with an event/action flag that is placed on an object. By placing the tag with lease and event/action flags on the object, the tag may be used to build application logic that can put the tag to use based on the lease and the event/action flag. For example, the FMITM may execute an auto-delete action for all copies of the object using the provenance functionality from prior filings.

In certain embodiments, object tags that are lease based with delta and absolute lease times allow for lease expirations to be added to the contextual protections in the FMITM. In other embodiments, object tags that contain lease event/action flags allow the context of the timing from lease expiration to be combined with event behavior. For example, events may include: reset other tag policies to none, to harden policies further, or to delete or clone the object. In yet another embodiment, using the FMITM allows the FMITM policy capabilities to be applied as well. Based on the policy applied, a tiered set of leases may be applied to the tag and the policy engine may act based on the each lease term (e.g., term 1 may have a very restrictive access policy, then, in another time offset (e.g., 2 years), the restrictions may be reduced, then a third tier lease could specify the object be deleted).

Figure 3:
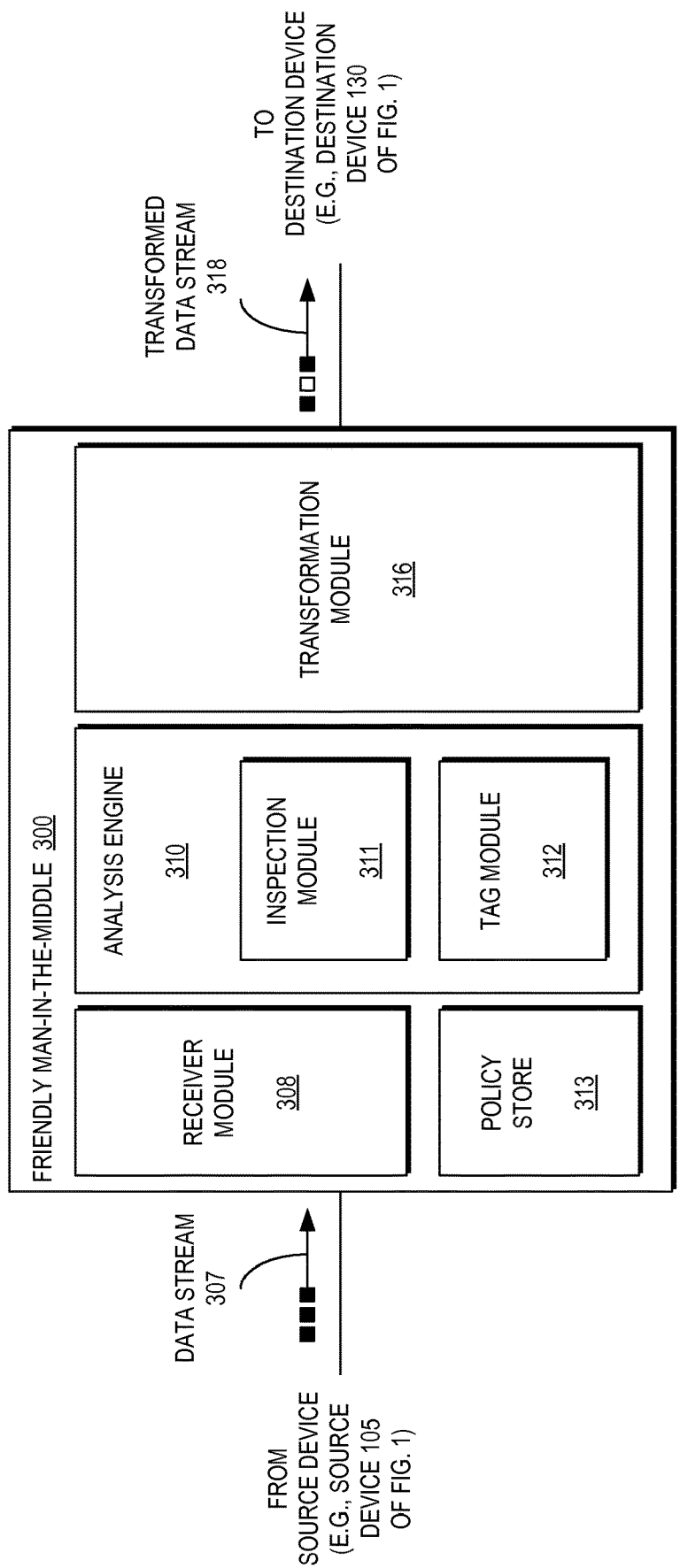
FIG. 3 is a block diagram illustrating a man-in-the-middle and a source device with an agent according to example embodiments of the present invention.

FIG. 3 is a block diagram illustrating a man-in-the-middle and a source device with an agent according to example embodiments of the present invention. FIG. 3 may be described in conjunction with FIGS. 4-7, which are flow diagrams illustrating methods according to example embodiments of the present invention.

Figure 4:
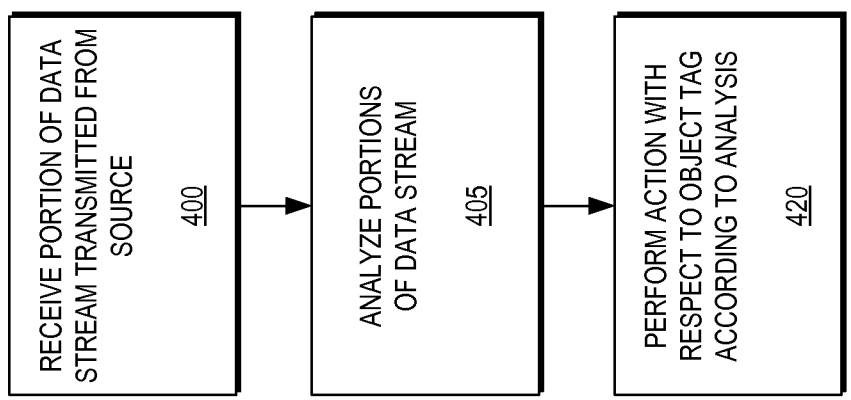

As illustrated in FIGS. 3 and 4, a receiver module 308 of a FMITM 300 may receive portions of a data stream 307 transmitted from a source (e.g., source device 105 of FIG. 1) (400). An analysis engine 310 then may analyze the portions of the data stream 307 (405). Based on the analysis, a transformation module 316 of the FMITM 300 may perform an action with respect to an object tag according to the analysis (420). In certain embodiments, the analysis engine 310 may determine whether the data stream 307 comprises object tags associated with objects included in the data stream.

Figure 5:
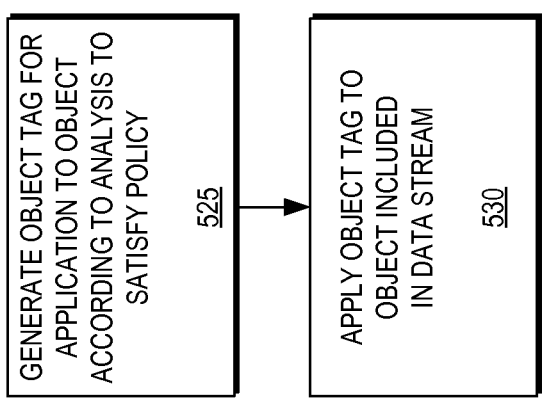

As illustrated in FIGS. 3 and 5, if the data stream 307 does not comprise object tags associated with objects included in the data stream, an inspection module 311 of the analysis engine 310 may inspect the objects for objects satisfying a policy (e.g., stored in a policy store 313). A tag module 312 of the analysis engine 310 then may generate an object tag for application to the object included in the data stream 307 according to the analysis to satisfy the policy (525). A transformation module 316 of the FMITM 300 then may apply the object tag to the object included in the data stream 307 (530).

Figure 6:
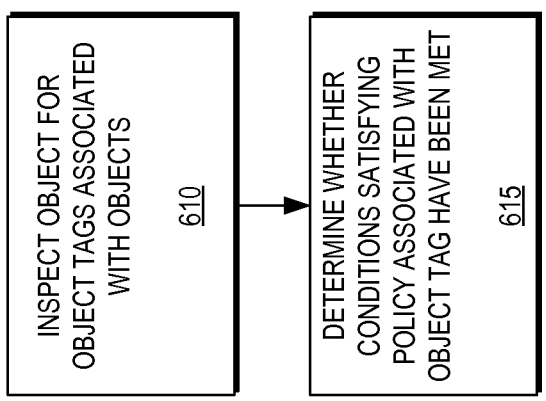

As illustrated in FIGS. 3 and 6, if the data stream 307 does comprise object tags associated with objects included in the data stream, the inspection module 311 of the analysis engine 310 may inspect the objects for object tags associated with the objects (610). The tag module 312 of the analysis engine 310 then may determine whether conditions satisfying a policy (e.g., stored in a policy store 313) associated with the object tag have been met (615). For example, the tag module 312 may determine whether an event has occurred, whether an event is scheduled to occur, or whether a period of time has transpired. Events may be the passage of time, something occurring to the object (e.g., network move), or the occurrence of an external event.

Figure 7:
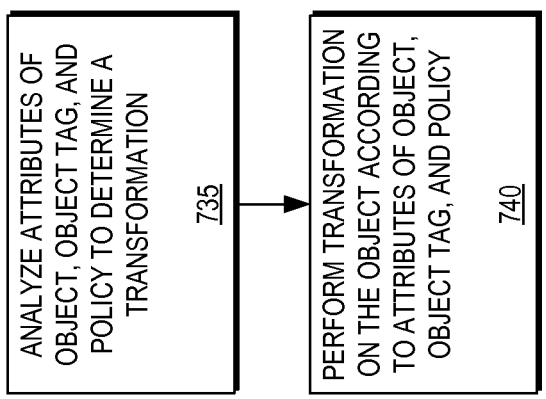
FIGS. 4-7 are flow diagrams illustrating methods according to example embodiments of the present invention.

As illustrated in FIGS. 3 and 7, the tag module 312 may analyze attributes of the object, the object tag, and the policy to determine a transformation for the object (735). The transformation module 316 then may perform the transformation on the object according to attributes of the object, the object tag, and the policy (740).

For example, for the marketing organization message example presented above, if the tag's lease is set to one week, at the end of the lease, the expiration occurs and the object could then become "deletable" without forcing the user to be asked if it is okay to delete it. In another embodiment, the object automatically disappears (i.e., is deleted) due to the flag on the object that shows that the lease has expired.

Further, for the baby picture example presented above, if the baby picture lease is set to 18 years, after the passage of time, the picture no longer needs the same protection due to change in context of time relative to the object and the impact on the baby who is now an adult.

Moreover, for the legal document example presented above, if the lease is set to 10 years (e.g., for regulatory compliance), once the lease has expired the document may, for example, have its confidentiality settings reduced or, alternatively, may automatically disappear (i.e., be deleted). Alternatively, the object may be encrypted.

In a further example, a "college-pictures" tag may have policies governing attributes of tagged pictures based on time. For example, during a student's first semester of senior years, the "college-pictures" tag may have a policy of "friends-only" where only the student's friends are able to see the picture. At a later time during second semester of senior year, the policy may change to "restrict visibility" because the student is conducting job interviews. When the student turns twenty-five years old, the policy may change to "delete" to delete any copies of the tagged object.

In a similar example, the lease may be event-driven rather than time-driver. For example, the student may have an event that says "I'm interviewing," thereby causing the policy applied to the object via the tag to change. Similarly, the student may have an event that says "I'm getting married" which triggers different behaviors based on the policies applied (e.g., the objects are deleted).

It should be understood that, in certain embodiments, the methods described above may be adopted by service providers as a protocol, thereby allowing services, such as Facebook, to have their objects tagged and controlled. In such embodiments, the FMITM may apply the tags to the objects, but may not enforce them; rather, the service providers may enforce the tags. In other embodiments, the FMITM may have access to these services, traverse a user's objects, and take action on the objects according to an analysis of the objects during the traversal.

Further, it should be understood that complete buy-in by the services is not required. Rather, the service only needs to have the ability for inbound objects to be tagged. While many services remove tags from inbound objects, tags applied by the FMITM may be marked as immutable such that the FMITM may reapply the tags as necessary (e.g., the FMIFM may scan the service for tagged objects, examine the tags and, if the tags are not correct, retag the object and upload the object). Moreover, the FMITM may alert a user regarding that user being tagged in another user's objects and, in certain embodiments, may take action against those tags if they violate the user's policy. In other embodiments in which the other user employs a FMITM on their network, the user's FMITM may instruct (i.e., collaborate with) the other user's FMITM to remove the tag.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
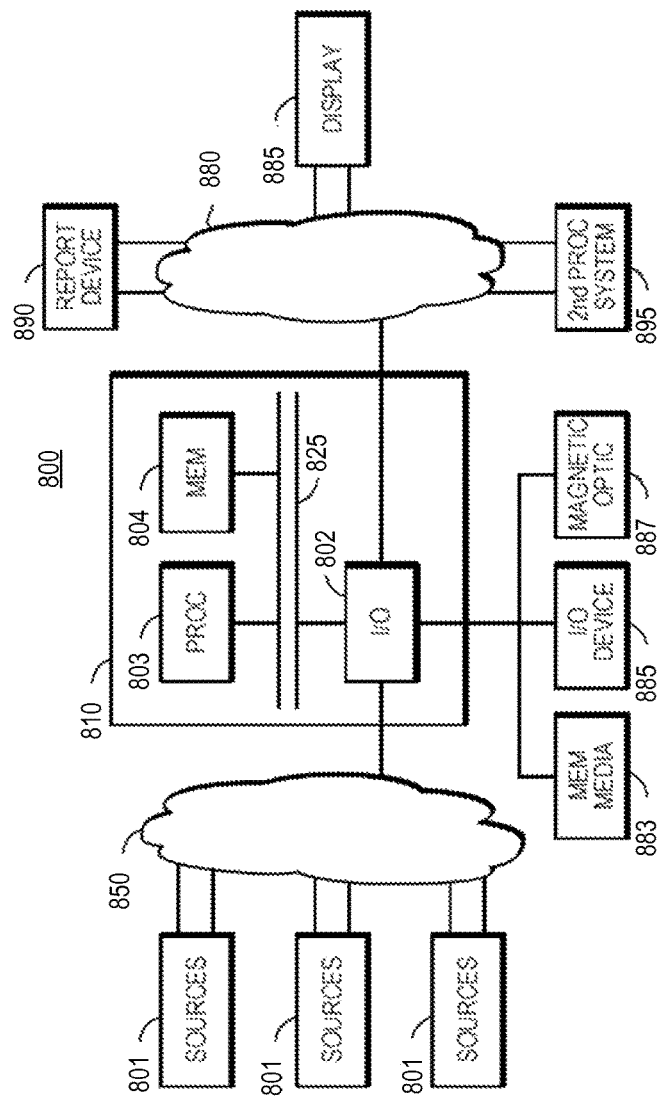
FIG. 8 is a block diagram of an example embodiment apparatus according to the present invention.

FIG. 8 is a block diagram illustrating an apparatus, such as a computer 810 in a network 800, that may utilize the techniques described herein according to an example embodiment of the present invention. The computer 810 may include one or more I/O ports 802, a processor 803, and memory 804, all of which may be connected by an interconnect 825, such as a bus. The I/O port 802 may provide connectivity to memory media 883, I/O devices 885, and drives 887, such as magnetic or optical drives. When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
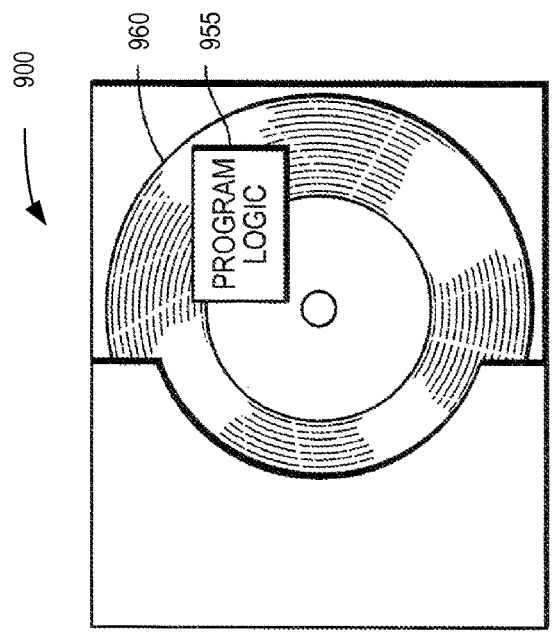
FIG. 9 is an illustration of an example embodiment of the present invention as embodied in program code.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method for transforming a cookie from a user data stream, the method comprising:
    intercepting a cookie from a user data stream before the cookie escapes a private network, wherein the cookie includes content;
    determining whether the content within the cookie includes private information, sensitive information, and an object tag defining an action with respect to the cookie according to a policy associated with the object tag, wherein the determining includes performing a lexical analysis of the content of the cookie;
    performing a transformation of the cookie according to the lexical analysis, wherein the transformation includes masking the private information and the sensitive information within the cookie; and
    sending the transformed cookie from the private network to a destination device.

2. The method of claim 1 wherein the determining comprises determining whether the user data stream comprises one or more associated object tags associated with the cookie included in the user data stream.

3. The method of claim 2, upon a determination that the user data stream does not comprise one or more associated object tags associated with the cookie included in the user data stream, the method further comprising inspecting the cookie for user data objects satisfying a policy.

4. The method of claim 3 wherein performing a transformation of the cookie according to the determination defined in the object tag and the policy comprises:
    generating the object tag for application to the cookie included in the user data stream according to the determination to satisfy the policy; and
    applying the object tag to the cookie included in the user data stream.

5. The method of claim 2, upon a determination that the user data stream does comprise one or more associated object tags associated with the cookie included in the user data stream, the method further comprising:
    inspecting the cookie for object tags associated with the cookie; and
    determining whether conditions satisfying the policy associated with the object tag have been met.

6. The method of claim 5 wherein performing the transformation comprises:
    analyzing attributes of the cookie, the object tag, and the policy to determine what to transform in the cookie; and
    performing the transformation on the cookie according to attributes of the cookie, the object tag, and the policy.

7. The method of claim 5 wherein the determining comprises determining one or more of whether an event has occurred, whether an event is scheduled to occur, and whether a time has transpired.

8. An apparatus for transforming a cookie from a user data stream, the apparatus comprising:
    a receiver module configured to intercept a cookie from a user data stream before the cookie escapes a private network, the cookie includes content;
    an analysis engine configured to perform a lexical analysis of the content of the cookie to determine whether the content within the cookie includes private information and sensitive information; and
    a transformation module configured to perform a transformation of the cookie according to the lexical analysis and a sending of the transformed cookie from the private network to a destination device, wherein the transformation includes masking the private information and the sensitive information within the cookie.

9. The apparatus of claim 8 wherein the analysis engine is configured to determine whether the cookie comprises one or more associated object tags associated with the cookie included in the user data stream.

10. The apparatus of claim 9, upon a determination that the user data stream does not comprise one or more associated object tags associated with the cookie included in the user data stream, further comprising an inspection module configured to inspect the user data stream for user data objects satisfying a policy.

11. The apparatus of claim 10 further comprising:
    a tag module configured to generate the object tag for application to the cookie included in the user data stream according to the determination to satisfy the policy; and
    a transformation module configured to apply the object tag to the user data object included in the user data stream.

12. The apparatus of claim 9, upon a determination that the user data stream does comprise one or more associated object tags associated with the cookie included in the user data stream, further comprising:
- an inspection module configured to inspect the cookie for object tags associated with the user data objects; and
- a tag module configured to determine whether conditions satisfying the policy associated with the object tag have been met.

13. The apparatus of claim 12
wherein the tag module is further configured to analyze attributes of the cookie, the object tag, and the policy to determine a transformation for the cookie; and
wherein the transformation module is further configured to perform the transformation on the cookie according to attributes of the user data object, the object tag, and the policy.

14. The apparatus of claim 12 wherein the tag module is further configured to determine one or more of whether an event has occurred, whether an event is scheduled to occurred, and whether a time has transpired.

15. A computer program product including a non-transitory computer-readable storage medium encoded with computer-program code that, when executed on a processor of a computer, cause the computer to transform a cookie from a user data stream, the computer-program product comprising:
- computer program code for intercepting a cookie from a user data stream before the cookie escapes a private network, wherein the cookie includes content;
- computer program code for determining the content within the cookie includes private information, sensitive information, and an object tag defining an action with respect to the cookie according to a policy associated with the object tag, wherein the determining includes performing a lexical analysis of the content of the cookie;
- computer program code for performing a transformation of the cookie according to the lexical analysis, wherein the transformation includes masking the private information and the sensitive information within the cookie; and
- computer program code for sending the transformed cookie from the private network to a destination device.

16. The computer program product of claim 15 wherein computer program code for the determining comprises computer program code for determining whether the user data stream comprises one or more associated object tags associated with the cookie included in the user data stream.

17. The computer program product of claim 16, upon a determination that the cookie does not comprise one or more associated object tags associated with the cookie included in the user data stream, further comprising computer program code for inspecting the cookie for user data objects satisfying a policy.

18. The computer program product of claim 17 wherein computer program code for performing the transformation of the cookie comprises:
- computer program code for generating the object tag for application to the cookie included in the user data stream according to the determination to satisfy the policy; and
- computer program code for applying the object tag to the cookie included in the user data stream.

19. The computer program product of claim 16, upon a determination that the user data stream does comprise one or more associated object tags associated with the cookie included in the user data stream, further comprising:
- computer program code for inspecting the user data objects for object tags associated with the cookie; and
- computer program code for determining whether conditions satisfying the policy associated with the object tag have been met.

20. The computer program product of claim 19 wherein computer program code for performing the transformation of the cookie according to the determination defined in the object tag and the policy comprises:
- computer program code for analyzing attributes of the cookie, the object tag, and the policy to determine what to transform in the cookie; and
- computer program code for performing the transformation on the cookie according to attributes of the user data object, the object tag, and the policy.

* * * * *